United States Patent [19]

Stillwagon

[11] Patent Number: 5,586,794
[45] Date of Patent: Dec. 24, 1996

[54] RESEALABLE FASTENING DEVICE

[76] Inventor: Woodrow C. Stillwagon, 7610 Ball Mill Rd., Atlanta, Ga. 30350

[21] Appl. No.: 361,429

[22] Filed: Dec. 21, 1994

[51] Int. Cl.[6] .................................................. E05C 19/00
[52] U.S. Cl. ............................................ 292/252; 411/348
[58] Field of Search ............................ 292/252, 34, 305, 292/307 R; 411/347, 348, 400, 401; 403/322

[56] References Cited

U.S. PATENT DOCUMENTS

| | | | |
|---|---|---|---|
| 2,625,357 | 1/1953 | Atkinson | 411/401 |
| 2,815,971 | 12/1957 | Guinane | 411/348 X |
| 3,177,543 | 4/1965 | Fountain | 188/65.2 |
| 3,215,023 | 11/1965 | Becker | 411/348 |
| 3,335,469 | 8/1967 | Shand et al. | 188/65.1 |
| 3,405,839 | 10/1968 | Saarem | 292/252 X |
| 3,617,081 | 11/1971 | Drucker | 292/252 |
| 3,948,362 | 4/1976 | Greest | 188/65.2 |
| 4,198,080 | 4/1980 | Carpenter | 411/348 X |
| 4,392,555 | 7/1983 | Ellis | 188/65.1 |
| 4,893,810 | 1/1990 | Lee | 482/107 |
| 4,908,916 | 3/1990 | Berte | 411/348 X |

FOREIGN PATENT DOCUMENTS

| | | | |
|---|---|---|---|
| 694791 | 9/1930 | France | 292/252 |
| 483334 | 2/1970 | Switzerland | 411/401 |

Primary Examiner—Rodney M. Lindsey
Attorney, Agent, or Firm—Erwin Doerr

[57] ABSTRACT

A resealable fastening device which is suitable for use in gripping and holding a stud. The device comprises an integrally cooperating collar with an elongated tubular housing which forces movable balls under the influence of a compression spring against a tapered surface to grip a stud. A camming device is required to install and disengage the resealable fastener.

5 Claims, 7 Drawing Sheets

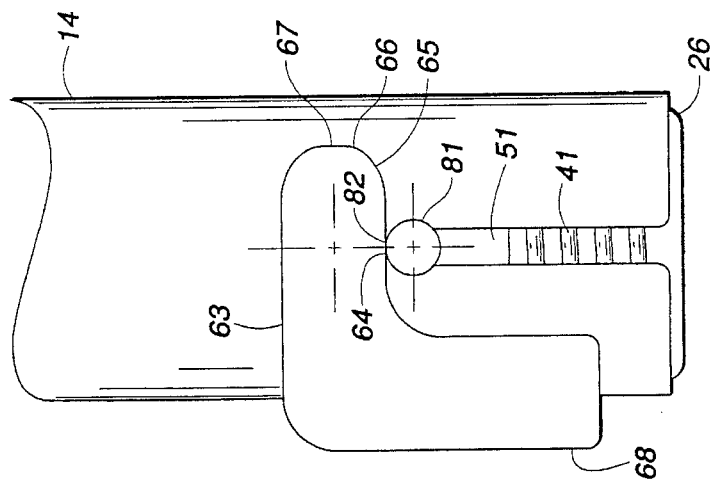
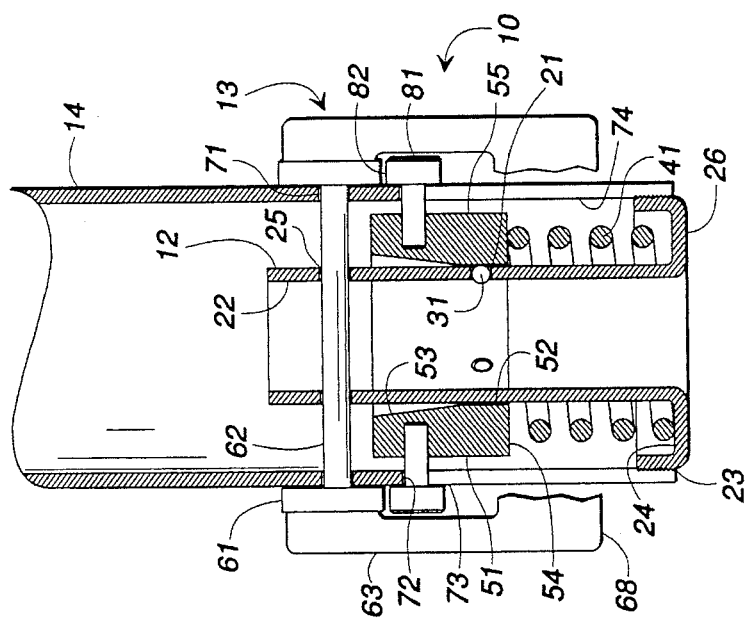
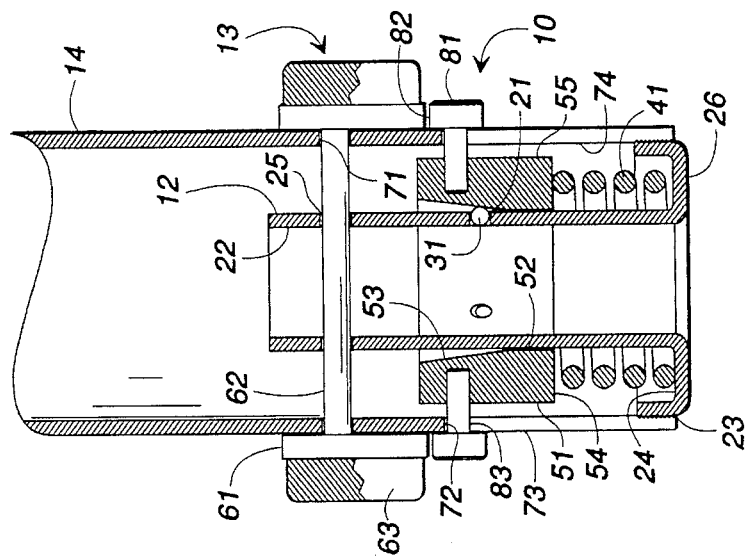

ize # 5,586,794

RESEALABLE FASTENING DEVICE

FIELD OF THE INVENTION

The invention relates to a high gripping force fastener and more particularly to a stud, but not limited to, retaining a removable passenger seat.

BACKGROUND OF THE INVENTION

Mini-Van vehicles have one or more removable passenger seats. Known fastening devices include a flange with a horizontal bar that is mounted in the floor of the vehicle and one or more lever actuating latches that are attached to either the front or back corners of the passenger seat base. From time to time, the passenger seat or seats are removed from the vehicle to increase the cargo carrying capacity.

The operation of the prior art device requires the simultaneous pulling up and retention of the corner mounted latches while at the same time lifting the seat clear of the floor mounted bar flange. Failure to lift the seat clear from the floor mounted bar flange can result in the inadvertent relatching of the seat to the bar flange if control of the seat is lost during the removal process. Releasing and removal of the seat requires considerable strength and dexterity to execute. Because the prior art latches comprise a plurality of upside-down U-shaped latch claws that partially encircle the bar of the floor mounted bar flange, it is difficult to physically remove the seat from the vehicle. The carpet on the floor of the vehicle can be snagged and/or torn during the seat removal activity. One or more of the U-shaped latch claws can be damaged or bent during the removal process from the vehicle or during the time the seat is in storage outside of the vehicle. A damaged or bent latch claw could prevent or make difficult the reinstallation of the seat in the vehicle. The handling of the seat, with its exposed latch claws, poses a potential injury hazard. When the seat is removed, the open floor mounted bar flange can provide a tripping risk.

SUMMARY OF THE INVENTION

According to the present invention, the above and other disadvantages are overcomed with this resealable fastening device. The stud of the present invention comprises an elongated bar with an islet that hinges the stud to the floor mounting flange of the vehicle. The stud, when not in use, folds down to provide a cover for the floor mounting flange. The stud, in the preferred embodiment, is reverse tapered, and not limited, from its terminus downward to two thirds of its usable length. The reverse taper urges the collar to tighten its holding action under the influence of shock and vibration. In an alternate embodiment, the stud is cylindrical. The fastener comprises a collar assembly including a cylindrical shell with an axial passage for the stud, a relative shoulder, a plurality of radial openings in the shell, and a circumferencial groove for maintaining a retention ring. A radially movable ball is located in each of the openings in the shell. The collar further includes a spring housing that is coaxial with and confined to the cylindrical shell element. A load transmitting body includes a cylindrical shell with an axial passage for the collar body, an internal flange, and a tapered inner surface adjacent to the movable balls. The tapered surface provides a relatively small diametrical adjustment to the movable balls in the first position and large adjustment in the second position. A tubular surface in cooperation with a stop element restricts the position of the load transmitting body relative to the collar body/spring housing assembly. Coaxially retained between the collar body/spring housing assembly and the load transmitting body is a compression spring. When the fastener is not attached to the stud, the compression spring applies sufficient compression force between the collar body/spring housing assembly and the load transmitting body to maintain relative alignment of the interfacing elements. When the fastener is attached to the stud, the compression spring applies a compressive force that is proportionate to its displacement and is transmitted axially by the radial openings of the collar body against the movable balls. The movable balls in cooperation with the tapered surface of the load transmitting body grips the stud. In the preferred embodiment that uses a reversed tapered stud with the collar assembly, the gripping force increases to resist disengagement. Deformation of the stud occurs under the influence of the hardened tapered surface and the movable balls. The deformed surface of the tapered stud, caused by the interface with the movable balls, is localized and thus will not interfere with the normal removal and reattachment of the collar assembly to the stud.

A mechanical camming device is needed to compress the collar assembly prior to insertion of the stud or removal of the stud. The compressed collar assembly is positioned above and lowered onto the raised stud. When the stud is installed to its full exposed length, the mechanical camming device is released to affix the collar assembly to the stud by allowing the compression spring to exert a coaxial force with the collar body that impinges the movable balls between the tapered surface of the load transmitting body and the stud.

These and other arrangements of the gripping and releasing function are used selectively in the various embodiments to effect the variety of inventive arrangements and applications as will become apparent upon view of the detailed specifications hereof.

BRIEF DESCRIPTION OF THE DRAWINGS

FIG. 3 is a cross-sectional view of the resealable fastener device in the second position.

FIG. 4 is a cross-sectional view of the resealable fastener device in the first position.

FIG. 5 is a side view of the resealable fastener device in the first position.

DETAILED DESCRIPTION OF THE PREFERRED EMBODIMENTS

Figure 1:
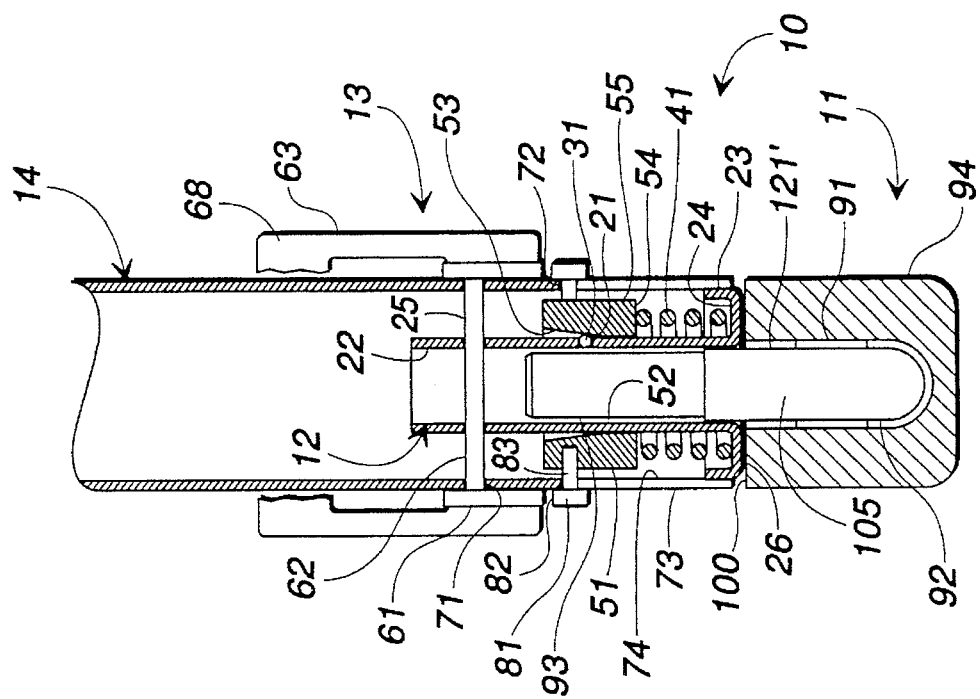
FIG. 1 is an assembled, cross-sectional view of the Resealable Fastener Device of the present invention, showing a preferred embodiment thereof.

Referring now in greater detail to the drawings in which like numerals represents like components throughout the several views, FIG. 1 depicts a preferred embodiment of the resealable fastener device 10 of the present invention. The resealable fastener device 10 is seen comprising four main portions, the floor mount portion 11, the shell portion 12, the cam actuator portion 13, and a tubular housing 14. The floor mount 11 of the embodiment in FIG. 1 is seen in greater detail in FIGS. 2, 6, 7, & 8, is shown comprising a lynch pin 91 that is affixed to a stud mount fixture 94, with a truncated section 93 that pivots about a formed islet 92 that is housed in the horizontal stop 97 recess with one or more floor mount passages 95. The shell portion 12 of the embodiment in FIG. 1 is seen in greater detail in FIGS. 3 & 4, is shown comprising of tubular passage 22 with one or more radial openings 21 and a movable ball 31 occupying each of these openings. The axial displacement of the movable ball 31 is controlled by their relative position with respect to the pressure ring 51. The pressure ring 51 includes a cylindrical inner surface 52, a tapered surface 53, a pressure application surface 54, and a cylindrical outer surface 55. The clearance between the cylindrical surface 52 of the pressure ring 51 and the shell 12 allows for linear alignment of the interfacing components. The clearance between the cylindrical outer surface 55 and the seat support tubular housing 14 allows lineal movement between the interfacing components while maintaining relative alignment. The actuator portion 13 of the embodiment in FIG. 1 is seen in greater detail in FIGS. 2, 3, 4, & 5, is comprised a release cam 61 with a lever arm 63 that pivots about the cam axis 62 that passes through the pivot hole 71 to interact with cam follower pin 81 to influence the position of the pressure ring 51.

In the preferred embodiments of the present invention, such as represented in FIGS. 1–5, the seat support tubular housing 14 provides a rigid structure for affixing the shell 12 between the shell interface 23 and the inner support housing 74. The affixed shell 12 provides a fixture for guiding the pressure ring 51 under the influence of pressure being applied by the release cam 61 against the cam follower 81. The orientation of the pressure ring 51 is maintained by the cam shank 83 that is guided by the cam ring guide slot 73 which is vertically located in the wall of the seat support tubular housing 14. Opposing the compressive force of the release cam 61 is the pressure spring 41 which is positioned in the spring retention shoulder 24 of the shell 12 to exert pressure against the pressure application surface 54. The cam ring guide/stop 72 in cooperation with cam shank 83 of the cam follower pin 81 limits the vertical travel of the pressure ring 51 under the influence of the pressure spring 41.

The embodiment shown in FIGS. 4 & 5 depicts the invention in the first position. The lever arm 63, which rotates through the pivot hole 71 and about cam axis 62, the minimum travel cam surface 64 is in direct contact with the cam stop surface 82 of the cam follower 81. In this first position, the cam ring guide/stop 72, in cooperation with the minimum travel cam surface 64, limits the vertical travel of cam follower pin 81. Lifting the lever grip 68 of the lever arm 63 to the raised position shown in FIGS. 1, 2, & 3, the lever grip 68 is maintained in a position relative to the cam follower pin 81 by resting in the recessed interface between the cam dwell point 67 and the cam stop surface 82. In raising the lever grip 68, the lever arm 63 is rotate through 90° about the cam axis 62 through the pivot hole 71 from the minimum travel cam position 64 through the position transition cam surface 65 to the maximum travel cam surface 66 before settling in the cam dwell point 67. The radial displacement of the cam dwell point 67 is less than the radial displacement of the maximum travel cam surface 66 to form a resting point for the cam stop surface 82 of the cam follower pin 81 to stop. Under the influence of the pressure being applied by the raised lever arm 63, the pressure ring 51 is depressed to its lowest position by pressure being applied through contact with the cam follower pin 81. In the second position, the radial pressure applied by the cylindrical surface 52 against the movable balls 31 is relieved. The movable balls 31 are free to retract while in contact with the tapered surface 53. The tubular passage 22 is relieved of any obstruction that can be created by the impingement of the movable balls 31 protruding through the radial opening 21 in the shell 12. With the movable balls 31 in the retracted position, the elevated truncated section 93 or the straight section 93' can be inserted into the tubular passage 22 without difficulty.

Figure 2:
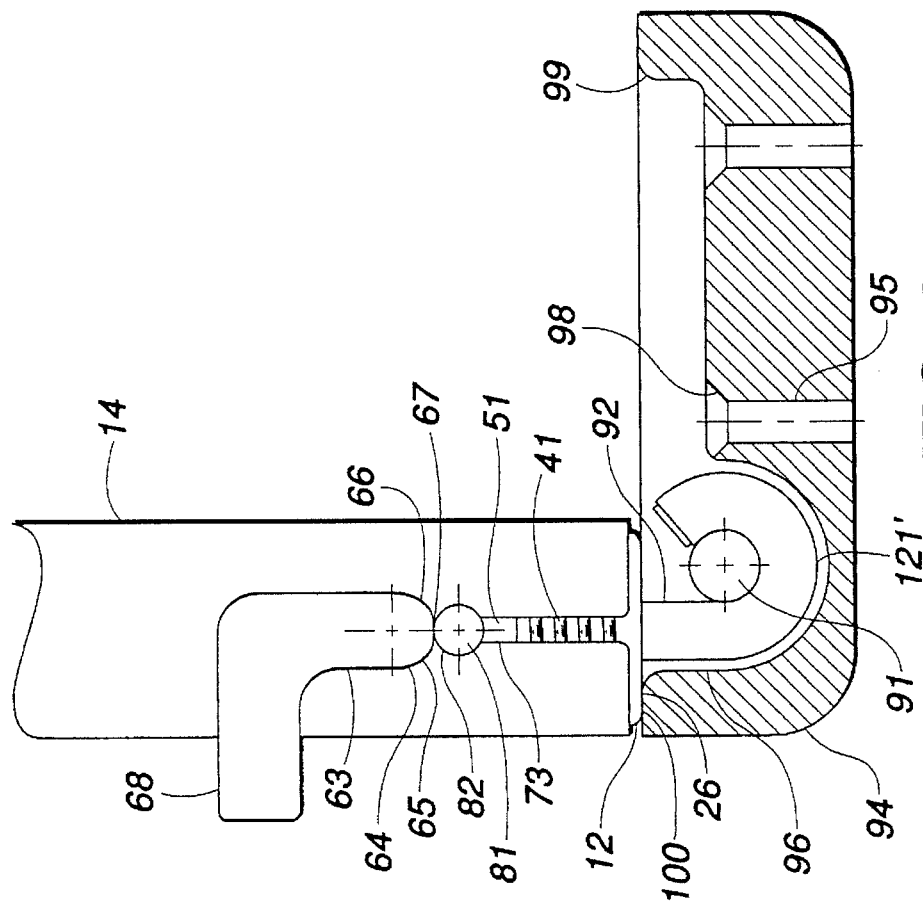
FIG. 2 is an assembled, side view of the resealable fastener device as shown in FIG. 1.

The embodiments shown in FIG. 1 depicts the invention with the truncated section 93 of the floor mount 11 in the elevated position and inserted into the tubular passage 22 of the shell 12. When the bottom surface 26, as shown in FIGS. 1 & 2, is lowered to a position that contacts the support surface 100, the lever arm 63 can be rotated downward to the position shown in FIGS. 4 & 5 to permit the movable balls 31 to impinge the truncated post 93 under the influence of the pressure spring 41 applying a vertical compressive force against the pressure application surface 54 which applies a cooperative radial force under the influence of the tapered surface 53 and the movable balls 31 whose vertical position is being restricted by the radial opening 21. The radial opening 21 exerts an opposing force to that applied by the pressure spring 41. In the preferred embodiment, a hardened movable ball 31 is cammed radially under the influence of a hardened tapered surface 53 to impinge upon a less hard truncated section 93 or straight section 93'. The clearance between the full diameter shank 105 penetrating the tubular passage 22 is limited to provide linear alignment of the interfacing components and increase the horizontal resist shear between the mating surfaces.

Figure 6:
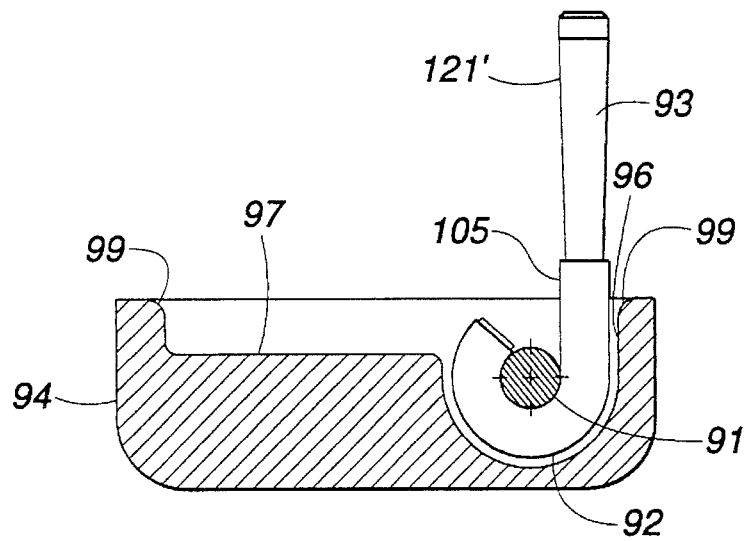
FIG. 6 is a cross-sectional view of the floor mount apparatus with the truncated stud elevated as shown in FIG. 1.
Figure 7:
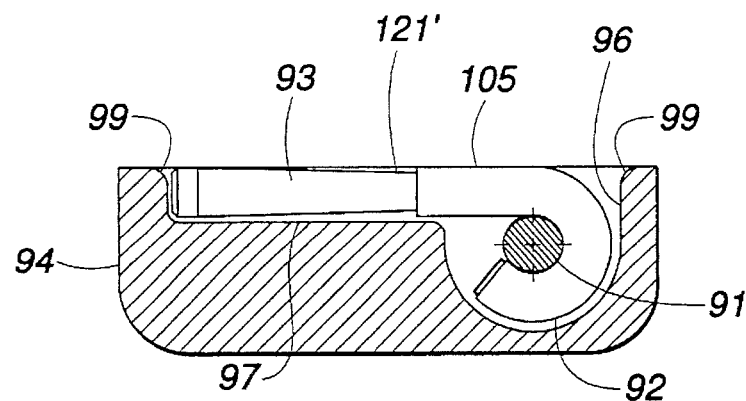
FIG. 7 is a cross-sectional view of the floor mount apparatus with a truncated stud lowered.
Figure 8:
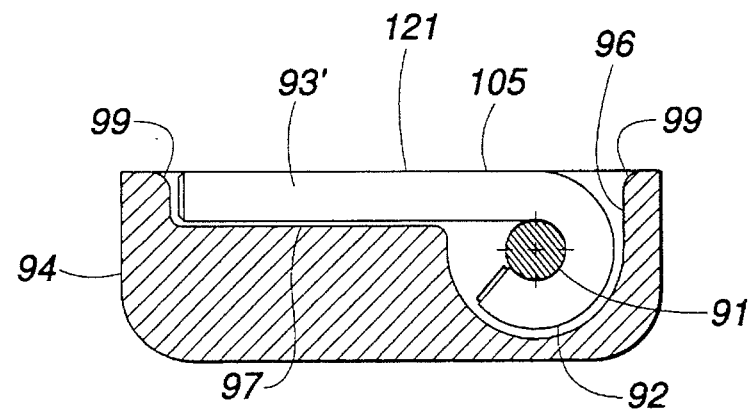
FIG. 8 is a cross-sectional view of the floor mount apparatus with a straight stud lowered.

The embodiments shown in FIGS. 6, 7, & 8 depict the floor mount 11. Detailed in FIG. 6 is an elevated truncated section 93 which pivots about the lynch pin 91 which is rigidly affixed to a stud mount fixture 94 and retained by the formed islet 92. In the elevated position, the vertical travel of the raised stud is limited by the stud vertical stop 96 in cooperation with formed islet 92 and lynch pin 91. FIGS. 7 & 8 depict the truncated section 93 or the straight section 93' lowered into the recess formed by the horizontal stop 97 in the stud mount fixture 94. The horizontal stop 97 is radiused on its upper most surface with pinch point relief 99. One or more vertical floor mount passages 95, with tapered mount recesses 98, are used to affix the floor mount 11 to the floor of the motor vehicle.

Figure 9:
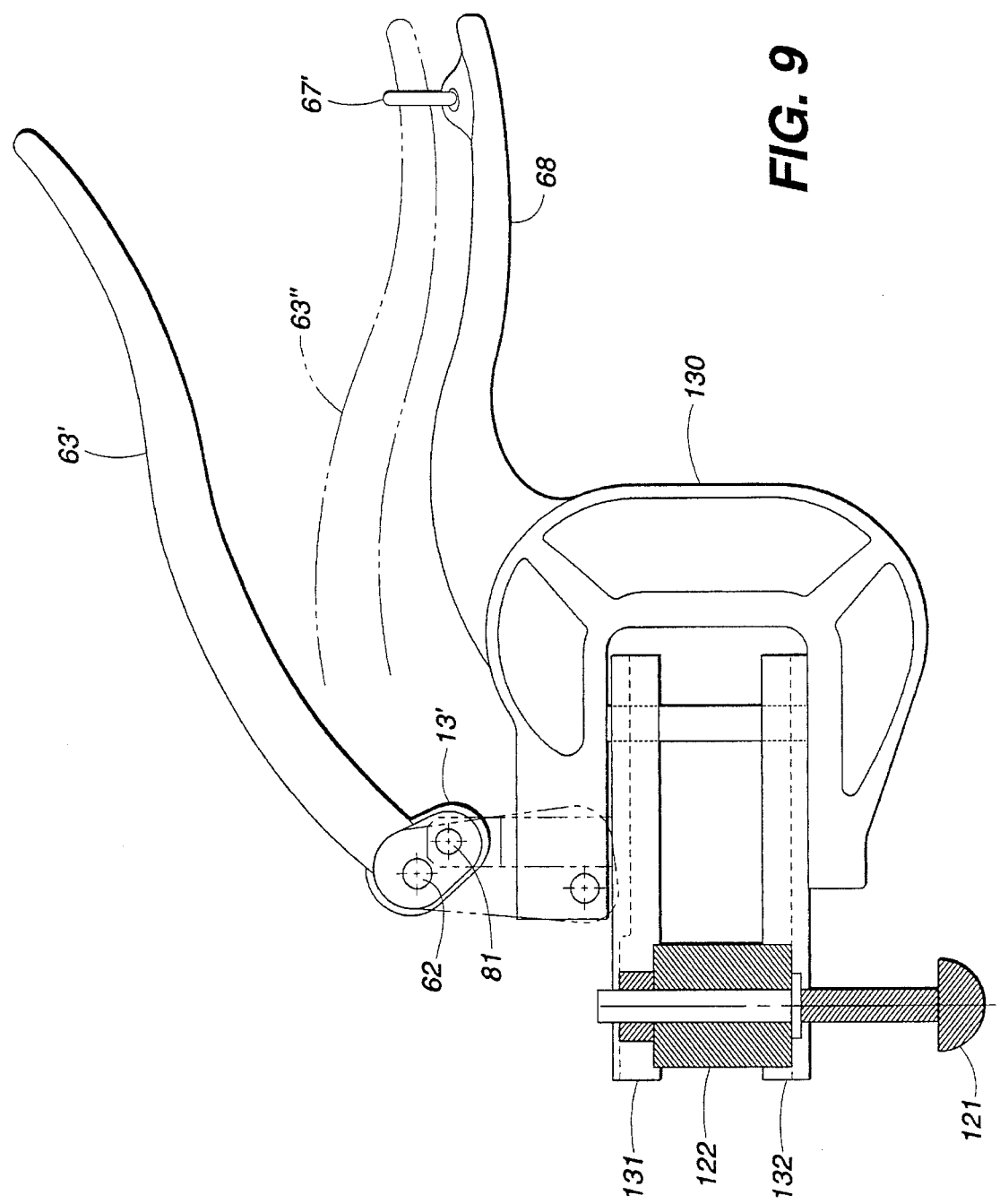
FIG. 9 is a pictorial view of the resealable collar and application tool.
Figure 10:
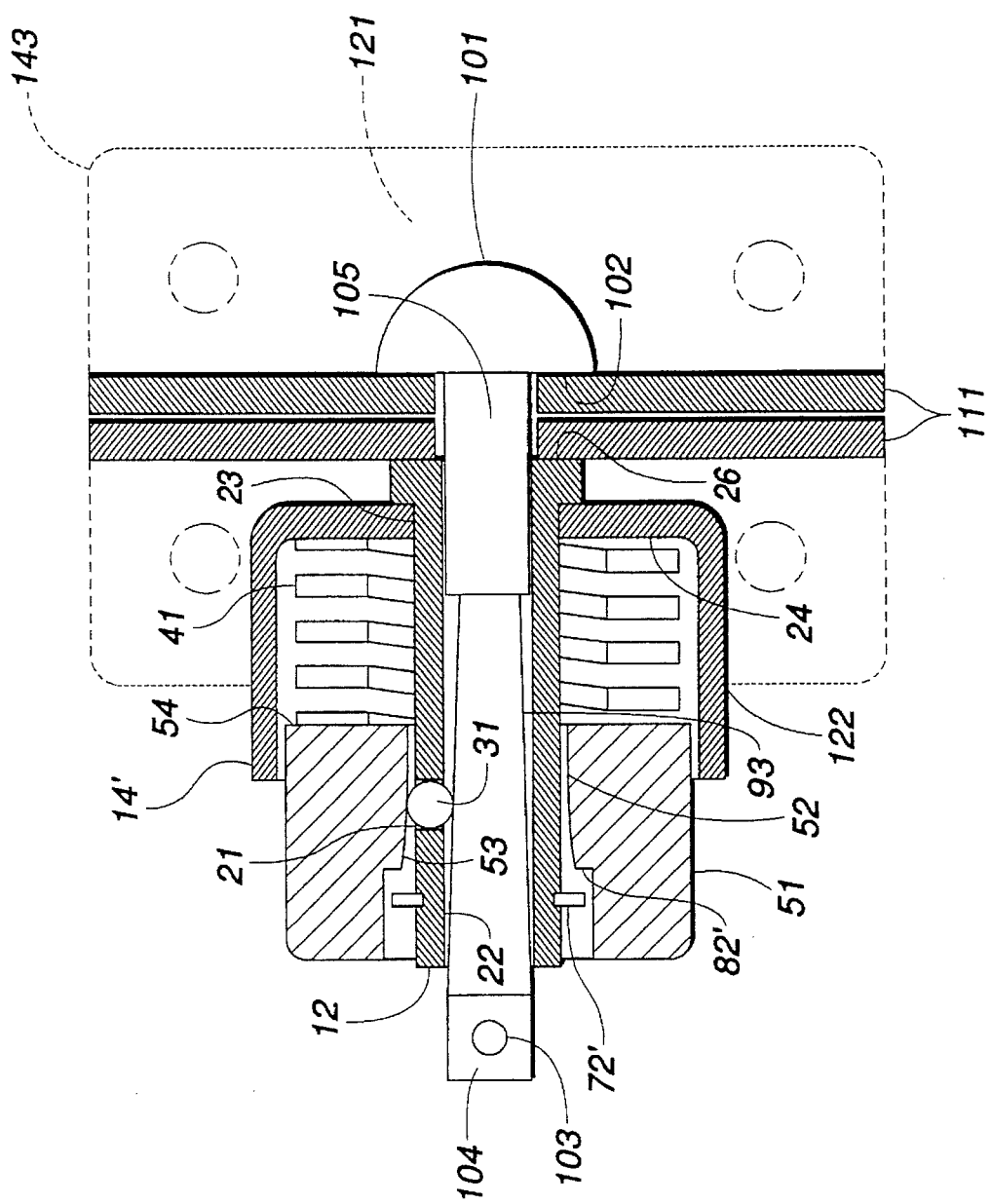
FIG. 10 is a cross-sectional view of an alternate embodiment of the resealable fastener engaging a flanged hasp.
Figure 11:
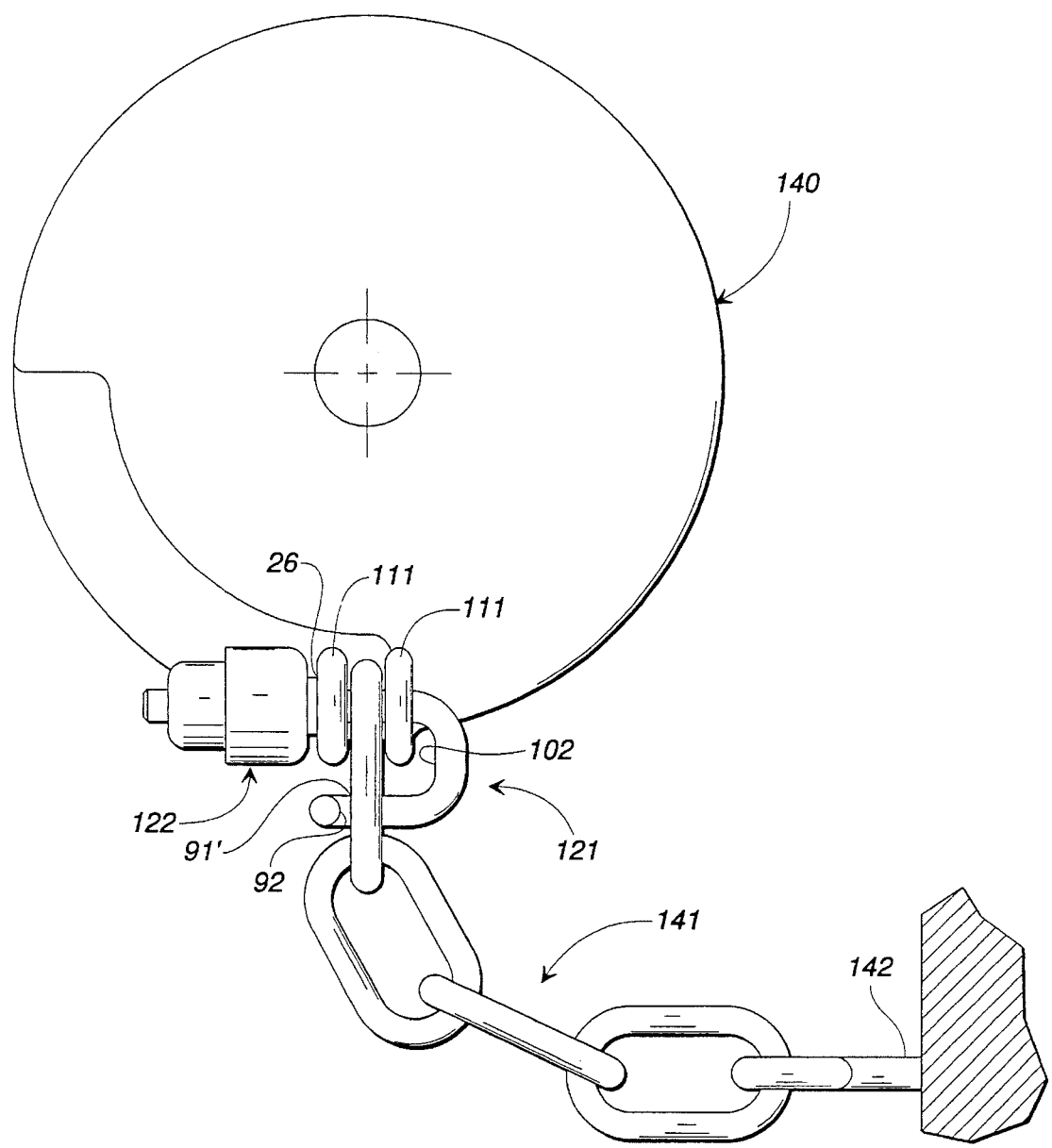
FIG. 11 is a pictorial view of an alternate embodiment of the resealable fastener engaging a rotary hasp and chain.
Figure 12:
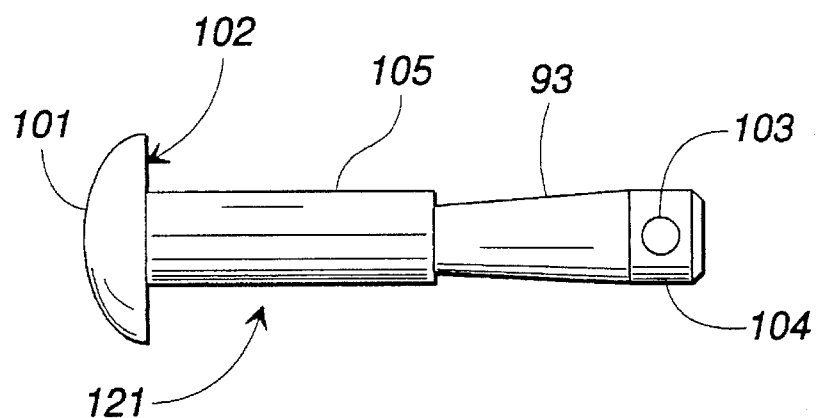
FIG. 12 is a side view of the stud shown in FIG. 10.
Figure 13:
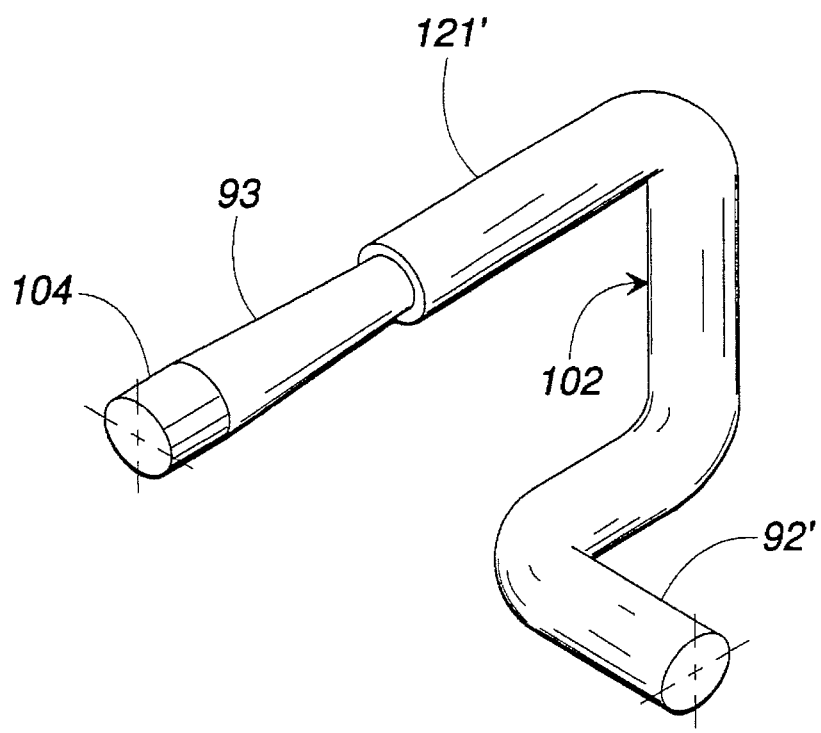
FIG. 13 is an isometric view of the hooked stud shown in FIG. 11.

As mentioned in the Summary, the unique combination of shell 12, cam actuator 13, and truncated section 93 or straight section 93' in accordance with the present invention provides the capability of a variety of gripping and releasing arrangements which can be utilized or in sequence to effect numerous practical mechanisms. FIG. 9, depicts an alternate application of the invention where are separate clamp assembly tool 130 which is a modification of a Model XX tool manufactured and sold by the Roper Whitney Company is used to operate the collar assembly 122. In this alternate embodiment, clamp assembly tool 130 depicts the lever arm 63' in the idle first position. The collar assembly 122 is compressed by grasping and holding the lever arm 63' to the position shown in dashed lines by lever arm 63". In the second position, the lever arm 63" pivots about cam axis 62 and provides a downward thrust on cam follower pin 81 to apply compressive force on the cam actuator 13' which is transmitted to the compressive surface 131. The collar assembly 122 is compressed between the compressive surface 131 and the base surface 132. The lever arm 63" is retained in the second position with the clamp dwell retaining ring 67' that is part of the lever grip 68 of the clamp assembly tool 130. Compressing the collar assembly 122 permits the insertion of the straight stud 121 or the hooked stud 121'. After inserting the straight stud 121 or the hooked stud 121', the lever arm 63" is released to affix the collar assembly 122 to the straight stud 121 or the hooked stud 121'. In the released position, and the lever arm 63' returns to the first position. The clamp assembly tool 130 can be removed from the straight stud 121 or the hooked stud 121' and collar assembly 122. Referencing FIGS. 10 & 11, flange elements 111 are held between the retention surface 102 of the straight stud 121 or the hooked stud 121' and the bottom surface 26 of the released collar assembly 122. More specifically, FIG. 10 details an alternate embodiment wherein the pressure spring 41 exerts a separating force between the spring centering recess 24 of the tubular housing 14' that is affixed to the shell 12 at the shell interface 23 and the pressure application surface 54 of the pressure ring 51. The tapered surface 53 exerts an compressive force on the movable balls 31 whose position is maintained by the radial openings 21 in the shell 12 that is affixed to the tubular housing 14'. The movable balls 31 impinges the truncated section 93 section of the straight stud 121. The stop ring 72' interfaces the pressure ring stop surface 82' to retain the pressure ring 51 relative to the shell 12 and tubular housing 14' assembly. The straight stud 121, as shown in FIG. 12, comprises a rounded stud head 101 with a retention surface 102, a shear resistant shank 105, a truncated section 93 section, and a full diameter termination section 104. The collar assembly 122 can be transformed into a security device by the addition of the tag hole 103 to the full diameter termination section 104 of the straight stud 121. A tamper evident tag seal, like the Spring-Lok® seal or the padlock seal produced by E. J. Brooks Company can be treaded through the tag hole 103 to complete the conversion to a security device. In another alternate embodiment, FIG. 11 demonstrates a rotary chain hasp 140 being engaged by a hooked stud 121' and collar assembly 122. In this embodiment, a chain 141 is affixed to a mounting surface with a chain mount 142 and retained by the coupled hooked stud 121' with a formed hook 92' element whose position is maintained by the retained chain link 91' that is sandwiched between the flange elements 111 that are secured between the retention surface 102 and the collar assembly 122. The ability to maintain the position of the hooked stud 121' permits the installation and removal of the collar assembly 122 with a clamp assembly 130 with lengthened lever arms 63. The hooked stud 121', as illustrated in FIG. 13, comprises a formed hook 92', a truncated section 93, a formed retention surface 102, and a cylindrical termination section 104.

Whereas the present invention has been described herein in detail with specific reference to preferred embodiments thereof, it will be understood that variations and modifications can be effected within the spirit and scope of the invention as described hereinbefore and as defined in the appended claims.

What I claim is:

1. A latching assembly comprising
   a rigid stud member (121, 121') having a free end,
   a retention surface (102, 102') adjacent to the other end of the stud member,
   a tubular support housing (14, 14') enclosing at least partially a fastening device (10) including a cylindrical shell (12) having an axial passage (22) for receiving said stud member through one end thereof, and a plurality of radial openings (21) provided in said cylindrical shell and arranged in circumferentially spaced relationship,
   a plurality of hardened balls (31) disposed in said radial openings of said shell and movable under the influence of said cylindrical shell,
   a spring retention shoulder (24) associated with said cylindrical shell at said one end of said cylindrical shell,
   a compression spring (41) positioned about said cylindrical shell and supported on said retention shoulder (24),
   a pressure ring (51) slidingly disposed about said cylindrical shell and having a pressure application surface (54) in contact with said compression spring,
   means for moving said pressure ring from a first to a second position with respect to said cylindrical shell and maintaining said ring in either position,
   said pressure ring having an interior cam surface comprising a portion adjacent said pressure surface which is parallel to said cylindrical shell and a portion which is outwardly tapered,
   whereby said pressure ring, when in said first position, forces said hardened balls to impinge on said stud member, and, when in said second position, releases said balls so that the stud member may be removed from said cylindrical shell or inserted therein.

2. The assembly in claim 1 wherein said stud member is of cylindrical cross section.

3. The assembly of claim 1 wherein the stud member is tapered from said free end in a reverse direction.

4. The assembly of claim 1 wherein said stud member is provided with a formed eyelet at the end opposite to said free end for attaching said stud member to a rigid surface, permitting the stud member to be moved from a substantially vertical to a horizontal position.

5. The assembly of claim 1 wherein said means for moving said pressure ring comprises a lever mechanism operatively associated with said pressure ring and mounted on the outside of said housing.

\* \* \* \* \*